(12) United States Patent
Ritter et al.

(10) Patent No.: US 6,289,100 B1
(45) Date of Patent: Sep. 11, 2001

(54) COMMUNICATIONS STATION HAVING HALL EFFECT DEVICE FOR CONTROLLING HOOKSWITCH OPERATIONS

(75) Inventors: David T. Ritter, Greensboro; Charles M. Farmer, Winston Salem, both of NC (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/265,533

(22) Filed: Mar. 9, 1999

(51) Int. Cl.$^7$ ...................................................... H04M 1/00
(52) U.S. Cl. ................................................................ 379/424
(58) Field of Search ..................................... 379/424, 425, 379/428, 429

(56) References Cited

U.S. PATENT DOCUMENTS

| | | | |
|---|---|---|---|
| 2,322,851 | * | 6/1943 | Kalb ....................................... 379/424 |
| 3,413,423 | * | 11/1968 | Stevko .................................. 379/424 |
| 4,022,980 | | 5/1977 | Kitajewski et al. . |
| 4,103,112 | | 7/1978 | Korsky . |
| 4,166,928 | | 9/1979 | Sabon . |
| 4,206,318 | | 6/1980 | Steely . |
| 4,300,021 | | 11/1981 | Van Husen . |
| 4,355,209 | | 10/1982 | Sabon . |
| 4,847,888 | | 7/1989 | Cox et al. . |
| 5,014,347 | | 5/1991 | Cox et al. . |
| 5,033,080 | | 7/1991 | Deane . |
| 5,065,088 | | 11/1991 | Habiro et al. . |
| 5,136,630 | | 8/1992 | Breneman et al. . |
| 5,179,588 | | 1/1993 | Nowicki . |
| 5,499,292 | | 3/1996 | Blonder et al. . |
| 5,504,813 | | 4/1996 | Takasaki . |
| 5,535,272 | | 7/1996 | Sugiyama et al. . |
| 5,559,625 | | 9/1996 | Smith et al. . |

FOREIGN PATENT DOCUMENTS 1-67055  *  3/1989  (JP) ....................................... 379/424

* cited by examiner

Primary Examiner—Jack Chiang
(74) Attorney, Agent, or Firm—Christian C. Michel; Alfred N. Goodman; Mark S. Bicks

(57) ABSTRACT

A communications station for use in a distributed audio system having two Hall-effect integrated circuits mounted on a printed circuit hook switch board, the hook switch board mounted within a handset cradle of the communications station. The Hall-effect integrated circuits place the communications station on-hook or off-hook, depending on the amount of ambient magnetic flux. The ambient magnetic flux varies with the presence or absence of a handset in the cradle. Thus, if a handset containing a magnet is in the cradle, and the applied magnetic flux is greater than the predetermined flux necessary to affect the Hall-effect integrated circuit, the communications station will go on-hook. When the handset and the resultant flux is removed from the cradle, the Hall-effect integrated circuit will change state and the communications station will go off-hook. Two unipolar Hall-effect integrated circuits are oppositely attached to the switch hook board in order for one of the circuits to change state when a magnetic flux of sufficient level is applied.

14 Claims, 7 Drawing Sheets

COMMUNICATIONS STATION HAVING HALL EFFECT DEVICE FOR CONTROLLING HOOKSWITCH OPERATIONS

FIELD OF THE INVENTION

The invention relates to a communications station having a Hall effect IC for placing the station on-hook or off-hook when the station handset is in the handset cradle or absent from the cradle. The invention also relates to a communications station for use in a distributed audio system having a Hall-effect integrated circuit (IC) mounted within a handset cradle of the communications station for placing the communications station on-hook or off-hook. The communications station can be used as a dedicated field party line telephone, page party or intercom system, and can employ carrier techniques for transmitting and receiving audio signals.

BACKGROUND OF THE INVENTION

A need exists for communication between personnel in large industrial and commercial facilities such as warehouses, power generating plants, refineries, manufacturing facilities, rail yards and sea ports, among other facilities. The use of radio communications is common; however, radio communications is not always effective in environments where the range of radio signals is limited by underground passageways, for example. Additionally, the ability to deliver emergency voice communications to a variety of personnel throughout a facility is difficult absent an accessible public address system.

One common system employs a page line and an audio line for station-to-station communications. In this manner, communications stations can be distributed throughout a facility and connected using page lines and audio party lines. Typically, only one conversation per party line can occur at a time, thereby limiting the number of simultaneous users to those who are parties to the conversation.

A user must first go off-hook to access the page line, page the desired party, tell the other party which alternate line to switch to, and release the page switch. Both parties must then switch to the same party line and go off-hook in order to converse. When the parties have completed their conversation, they must hang up the handset. Examples of known distributed audio systems are disclosed in U.S. Pat. No. 4,847,888 to Cox et al., U.S. Pat. No. 5,014,347 to Cox et al., U.S. Pat. No. 4,206,318 to Steely, U.S. Pat. No. 5,179,588 to Nowicki, U.S. Pat. No. 5,559,625 to Smith et al., and U.S. Pat. No. 5,033,080 to Deane.

For existing communications stations, on-hook/off-hook switching is accomplished using mechanical switches. For example, when the handset of a communications station is placed off-hook, a mechanical switch is activated to connect the telephone to the line. Such mechanical switches can be unreliable, large in size and expensive. Additionally, mechanical switches are generally exposed to environmental contaminants, for example, particulates or gases, which can corrode the mechanical switching mechanism and contacts. Other examples of harsh environmental conditions include exposure to moisture, corrosive vapors such as industrial chemicals or salt air, temperature extremes, particulates, radiation, electrical fields, stray magnetic fields, and the like. When exposed to these types of environments, the mechanical switches may corrode, become encrusted or otherwise become inoperable.

Alternatively, non-contact, magnetically-operated, reed switches have been used. The non-contact means are generally costly, more susceptible to stray electromagnetic fields, and less robust than mechanical switches. Reed switches, while generally sealed in an inert gas ampoule, may become inoperable when, for example, a fracture forms when exposed to temperature extremes, which may result in corrosion of the contacts. In another example, a stray magnetic field may cause the switch to become biased and therefore not respond properly.

Thus, there is a need for improved communications stations having reliable on-hook and off-hook switches that are small in size, low in cost and able to withstand harsh environmental conditions, and therefore are not susceptible to the corrosion of the contacts or weak stray magnetic fields.

SUMMARY OF THE INVENTION

Accordingly, an aspect of the present invention is a communications station having reliable on-hook and off-hook switches that can withstand harsh environments. A communications station such as a telephone has a handset support cradle which need not be physically a part of or connected to the body of the telephone. The handset support cradle can be disposed alongside the telephone body, or in the general proximity of the telephone body. This facilitates rapid replacement of components if necessary. A hookswitch board is preferably a part of the handset support cradle, and is electrically connected to the circuitry of the telephone.

In accordance with another aspect of the present invention, a communications station comprises a Hall-effect integrated circuit for on-hook and off-hook switching. A printed circuit board equipped with the Hall-effect device, HED, is mounted inside the communications station, or more specifically the handset cradle, in order to protect it from environmental effects. Additionally, the HED, and optionally the associated printed circuit board, can be coated or otherwise encapsulated in a protective material, for example, a solithane or a sealed plastic sheathing, for protection from harsh environmental conditions. Two HEDs are mounted on the printed circuit board for redundancy. Alternatively, two HEDs can be mounted on the printed circuit board so as to be inverted relative to each other. Each HED is directional. By utilizing inverted placement, a communications handset containing a magnet of unknown polarity can still reliably achieve on-hook/off-hook switching when placed near the HEDs.

In accordance with yet another aspect of the present invention, a field telephone is provided for use in a distributed audio system. The field telephone comprises a handset connected to a main telephone body. The handset generates a magnetic field caused by leakage flux from a magnet. A handset support cradle is attached to the telephone body and comprises a hook-switch board having a Hall-effect integrated circuit which reacts with the magnetic field when the handset is placed in the handset support cradle. The magnetic field affects the Hall-effect integrated circuit to place the field telephone in an on-hook state. Similarly, when the handset is removed from the handset support cradle, the magnetic field is removed from the Hall-effect integrated circuit, and the field telephone enters an off-hook state. The magnet can be a component of a receiver contained within the handset, or a separate component attached to the handset.

The distributed audio system includes a plurality of telephone lines, including a page line pair and a party line pair. Means are included in the telephone for selecting a telephone line pair and transmitting audio signals over the selected line pair to a receiving station. Each handset acts as a means for transmitting user audio signals to another connected telephone, and for receiving audio signals transmitted from another telephone. The Hall-effect integrated circuit performs the on-hook/off-hook switching of any selected and connected telephone line.

Other advantages and salient features of the invention will become apparent from the following detailed description, which, when taken in conjunction with the annexed drawings, discloses preferred embodiments of the present invention.

BRIEF DESCRIPTION OF THE DRAWINGS

Referring to the drawings which form a part of the original disclosure.

DETAILED DESCRIPTION OF THE PREFERRED EMBODIMENTS

Figure 1:
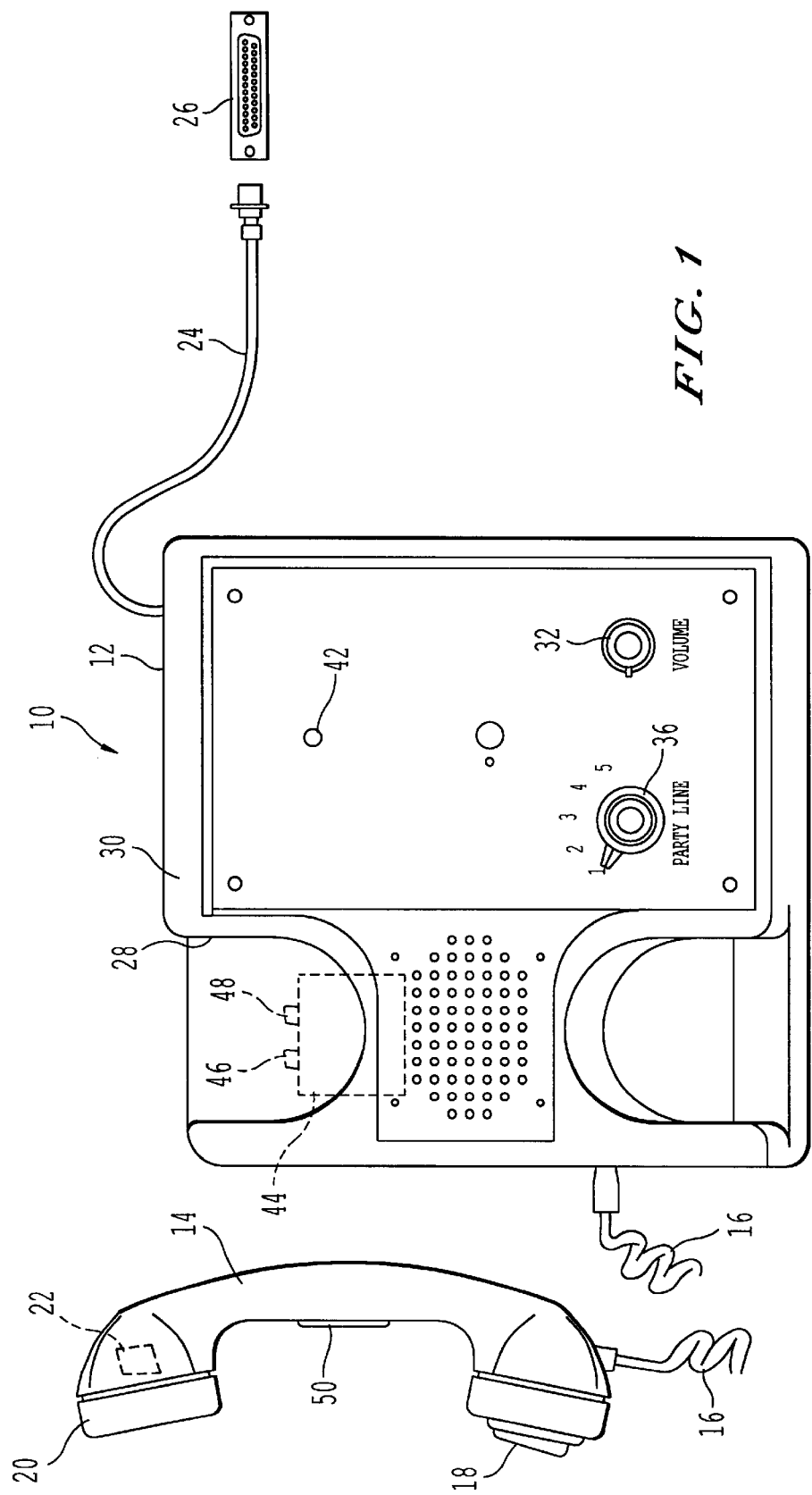
FIG. 1 depicts a communications station constructed in accordance with an embodiment of the present invention.
Figure 2:
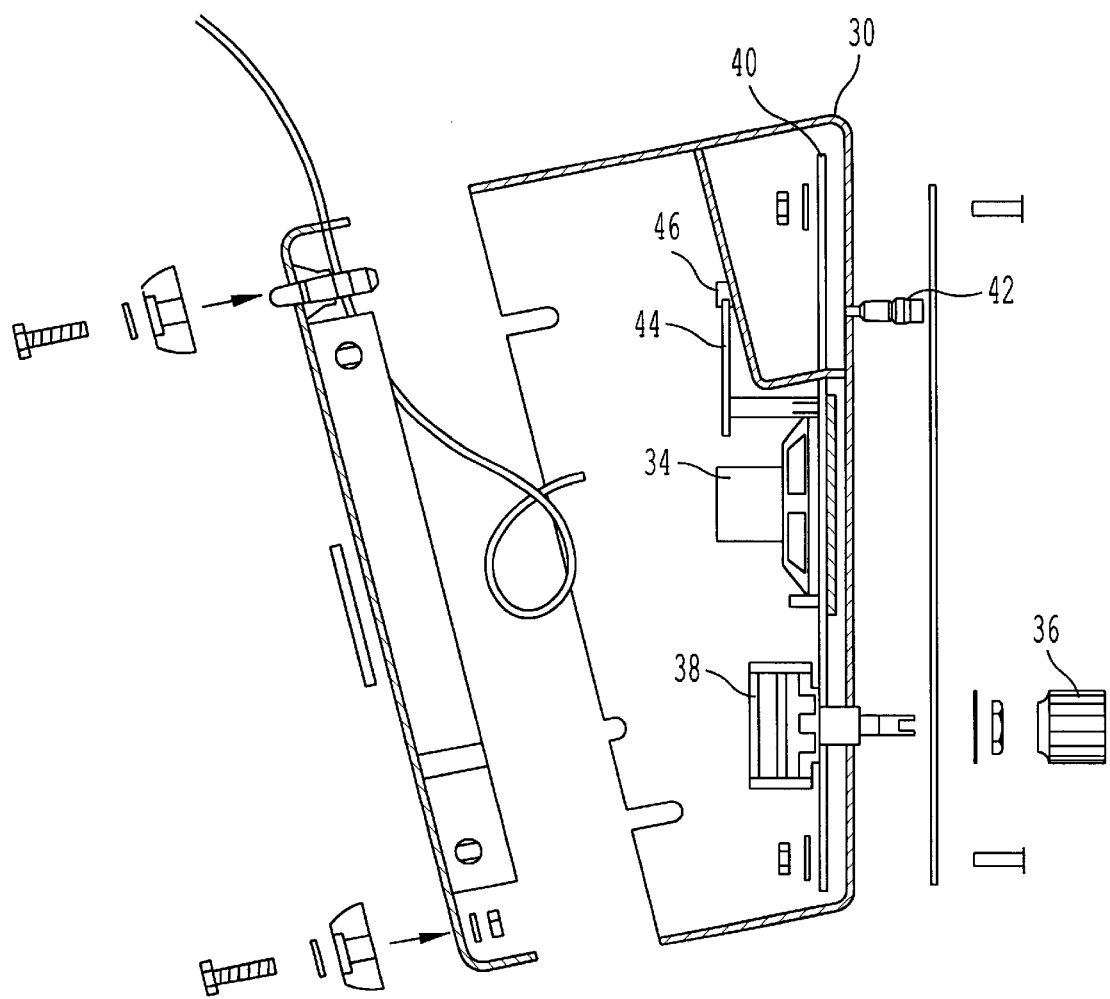
FIG. 2 is a side view of the communications station in FIG. 1.

FIGS. 1 and 2 illustrate a communications station 10 in accordance with an embodiment of the present invention. For illustrative purposes, the communications station 10 is a field telephone assembly for use in a distributed audio system. It is to be understood, however, that the aspect of the present invention relating to a Hall-effect integrated circuit for on-hook/off-hook switching can be implemented in other types of telephones or base stations. Examples of distributed audio systems without Hall-effect integrated circuits are described in U.S. Pat. Nos. 4,847,888 and 5,014,347, incorporated herein by reference. Distributed audio systems, which are also known as intraplant voice communications systems, and unitized or baseband audio systems, are characterized as having no operational relationship or connection to a central office or subscriber loop.

The field telephone assembly 10 includes a telephone body or housing 12 and a handset 14 which is connected to the body 12 by way of a handset connector cord 16. The handset 14 can be any conventional telephone handset having a microphone/transmitter 18 and a speaker/receiver 20, and designed so that a user can place the speaker/receiver 20 in the vicinity of the user's ear and the microphone/transmitter 18 in the vicinity of the user's mouth. Additionally, the handset can be replaced by or supplemented with a teletypewriter, an interactive video display terminal, a personal communications device, a laptop computer, a modem containing device, or other compatible communications receiving and transmitting device. The connector cord 16 is preferably any known multiwire insulated cable.

The handset 14 has a magnet 22 that generates a magnetic field about the handset. The magnet 22 can be integral with the speaker/receiver 20 or attached separately to the handset 14.

The field telephone assembly 10 is connected to a plurality of telephone lines through cable 24 and connector 26. The connector 26 is capable of interfacing with any type of telephone line, which could be copper pairs, fiber, coaxial or any other known type of telephone transmission line for baseband communications.

In accordance with an embodiment of the present invention, a handset support cradle 28 is incorporated into the body or housing 12 of the field telephone assembly 10. When not in use, the handset 14 is held in place in the handset support cradle 28. The handset support cradle 28 is preferably fabricated from molded plastic, and is shaped to retain at least a portion of the handset 14. In the preferred embodiment, the handset support cradle 28 is integral with the front panel 30 of the telephone body 12.

The field telephone assembly 10 also has a volume control knob 32 preferably located on the front panel 30. The volume control knob 32 allows a user to control the volume being output by a speaker 34 located in the field telephone. A party line knob 36 is also preferably located on the front panel 30. The party line knob 36 is connected through the front panel 30 to a selector switch 38. The party line knob 36 and selector switch 38 allow a user to select one of several telephone lines connected to the field telephone assembly 10 through the connector 26. The speaker 34, the party line knob 36, the selector switch 38, and other components can also be mounted to a mounting chassis 40 located behind the front panel 30. The mounting chassis 40 can be attached to the front panel 30 or the telephone body or housing 12.

A light emitting diode (LED) 42 can also be provided on the front panel 30 of the telephone body 12 to indicate when the field telephone assembly 10 is on-hook or off-hook. For example, when the field telephone assembly 10 is off-hook and connected to a telephone line, the LED 42 is illuminated. When the field telephone assembly 10 is on-hook or otherwise not connected, the LED 42 is not powered.

In accordance with the present invention, a Hall-effect printed circuit hook switch board 44 having at least one Hall-effect device (HED) 46 is provided behind the front panel 30 of the telephone body 12 and in the vicinity of the handset support cradle 28 is. The HED 46 places the telephone assembly 10 on-hook or off-hook, respectively, when the magnetic field generated about the handset 14 by the magnet 22 is present or absent with respect to the handset support cradle 28. In the preferred embodiment, two HEDs 46,48 are provided on the printed circuit hook switch board 44. Each HED 46,48 has a predetermined polarity, and consequently are inverted with respect to each other so that one of the HEDs 46,48 will activate when the handset 14, and therefore the magnet 22, is present in the handset support cradle 28. Inversion of the two HEDs 46,48 allows for situations where the polarity of the magnet 22 is not known. The HEDs 46,48 are preferably attached to the printed circuit hook switch board 44 so that they are optimally positioned, that is, the HEDs 46,48 are positioned relative to the expected location of the magnetic flux generated by the speaker/receiver 20 such that one of the HEDs 46,48 is affected by the flux from the magnet 22.

The HEDs 46 and 48 are preferably a Hall-effect IC model HAL506UA-E manufactured by Micronas of Frieburg, Germany. The preferred operating junction temperature range is −40° C. to +60° C.; however, this range can vary with the type of Hall-effect IC selected for the HEDs 46 and 48. Other common Hall-effect ICs which can be used have expanded temperature ranges from −40° C. to +170° C., and narrower ranges from 0° C. to +50° C. The preferred temperature range is selected to accommodate the environment where the HEDs 46,48 are to be deployed.

The Hall-effect IC is preferably unipolar, with the magnetic south pole on the branded side, or top, of the package. The output of the Hall-effect IC preferably is low when an applied magnetic flux is greater than 77 gauss. In accordance with the present invention, one Hall-effect IC is mounted facing upward on the printed circuit hook switch board 44, while a second Hall-effect IC is mounted facing downward on the printed circuit hook switch board 44, allowing for a magnet 22 with unknown polarity to generate a magnetic flux capable of affecting one of the HEDs 46,48. Similarly, the output of the Hall-effect IC turns high when the magnetic field is removed, or the magnetic field is reduced to below 21 gauss. The output high/low gaussian levels of the Hall-effect IC can be selected for the environment where the field telephone assembly 10 is to be employed. Thus, that is, the sensitivity levels described above (i.e., 21 to 77 gauss) characterize the most sensitive Hall-effect device that is presently commercially available. The desired high and low levels of a selected range for magnetic flux density can be other selected levels and are a function of the magnet 22 in the handset 14, or of the ambient magnetic flux in the environment where the field telephone assembly 10 is being used. For example, it may be desirable to have sensitivity levels that differ by plus or minus 50 gauss, so long as there is a clear threshold between output high and output low levels. Other makes and models of Hall-effect ICs may be used in the present invention. Thus, the selected HEDs 46,48 preferably have magnetic flux density sensitivities maximized to the environment where they are used, minimizing the effects of stray or otherwise ambient magnetic flux.

Figure 3A:
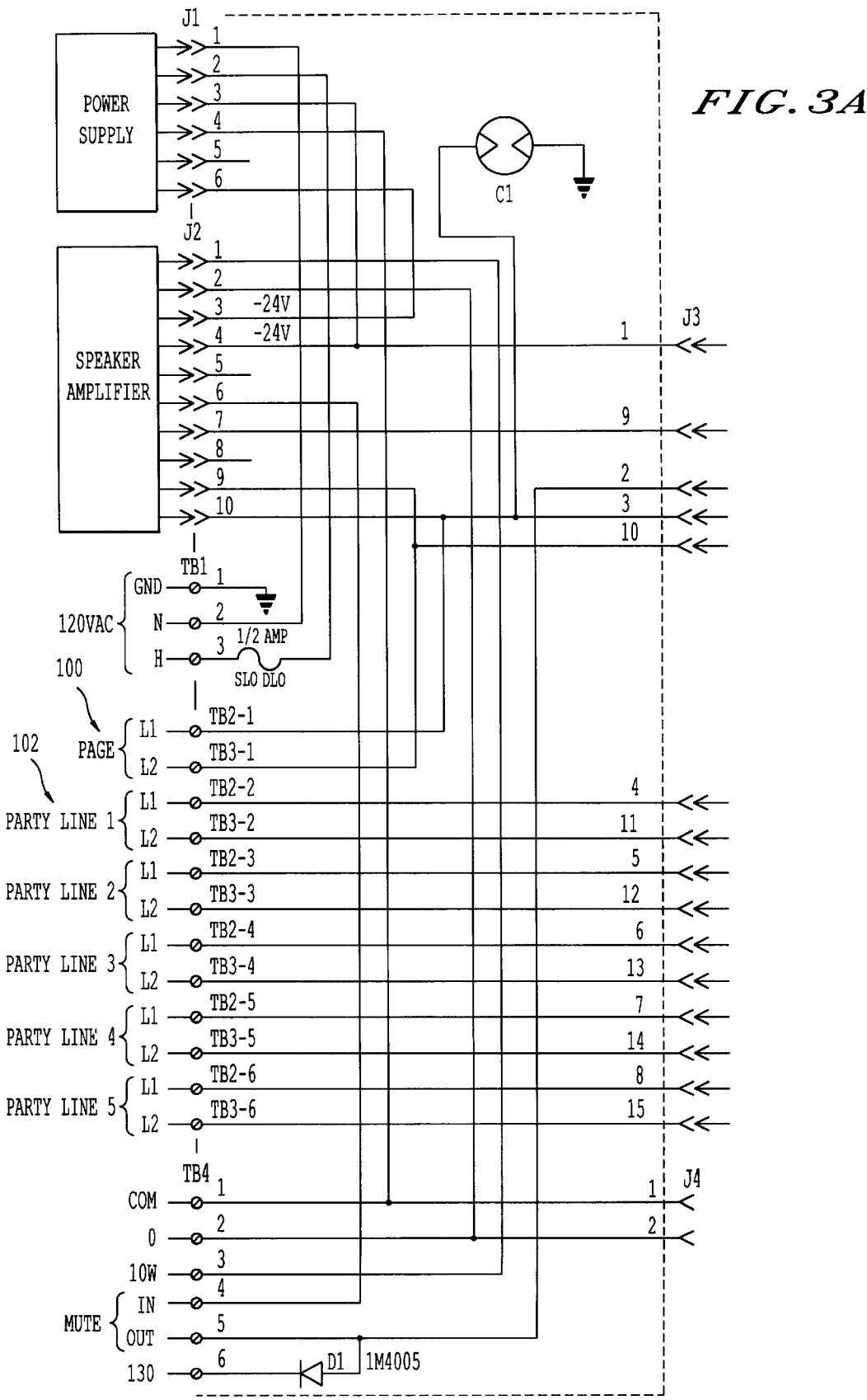
FIG. 3 is a schematic diagram of a field telephone assembly in accordance with an embodiment of the present invention.
Figure 3B:
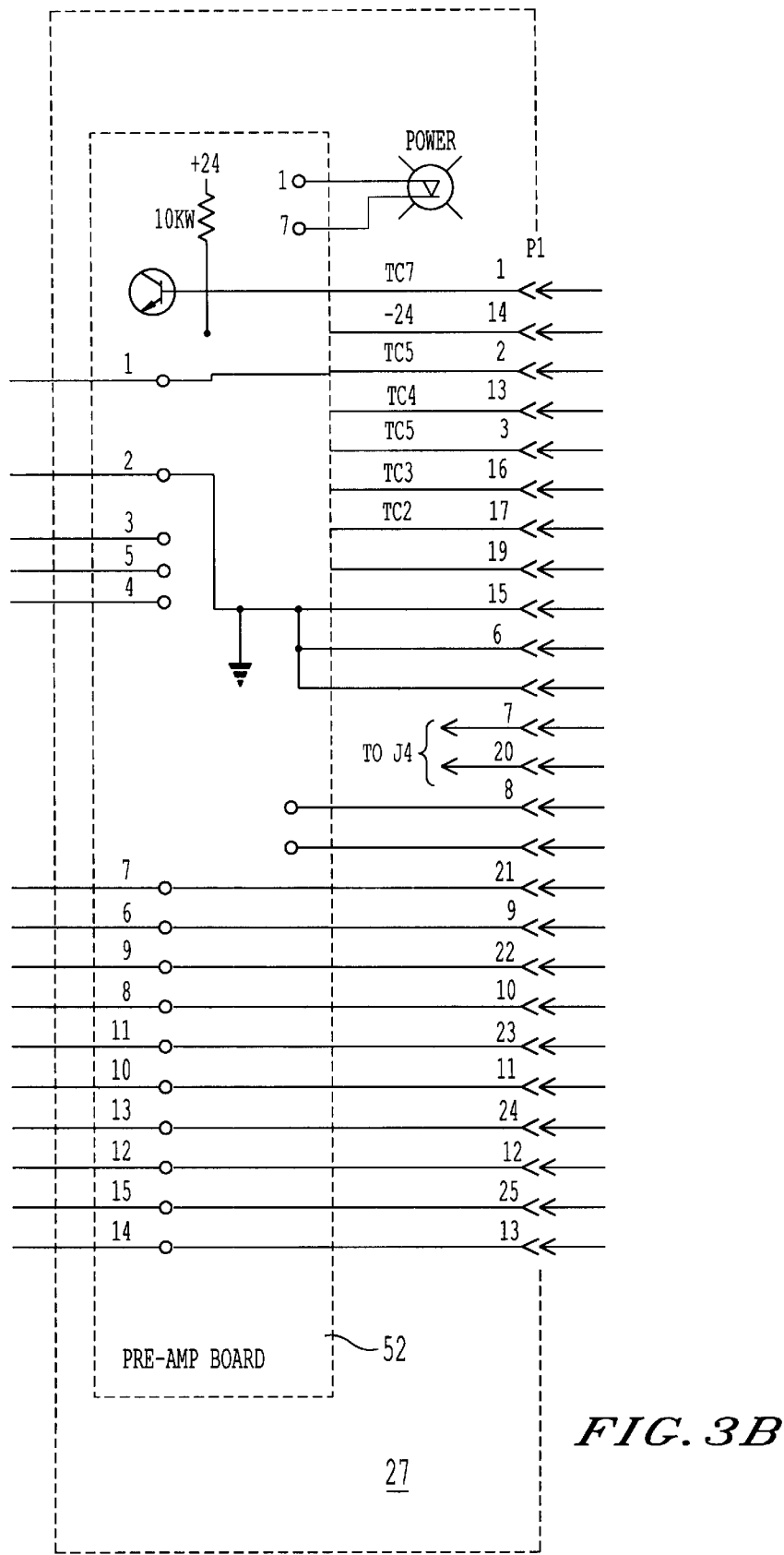
Figure 3C:
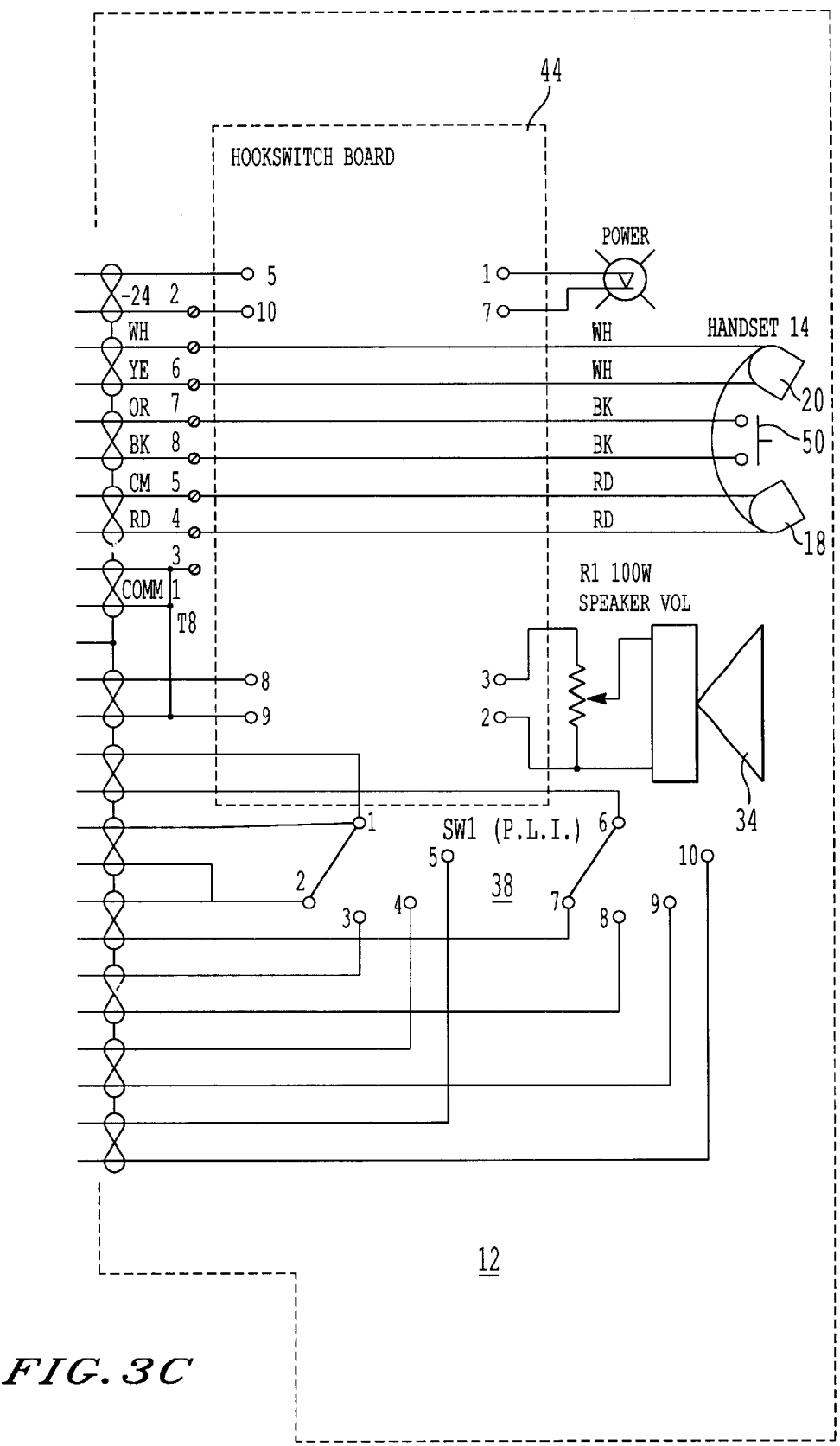

FIG. 3 is a schematic diagram of the field telephone assembly 10 shown in FIGS. 1 and 2. Wire connections between the handset 14, the speaker 34, the selector switch 38 and the printed circuit hook switch board 44, as they are mounted on the mounting chassis 40, are shown. The pre-amp board 52 can be mounted either in the housing 12 or in a wall box 27. When the pre-amp board 52 is mounted in wall box 27, connector 26 interconnects the housing 12 with the wall box 27. The default telephone line connection is the page line pair 100 when on-hook so that pages can be received. When the page switch 50 located on the handset 14 (FIG. 1) is depressed, and the field telephone 10 is placed off-hook, the speaker/receiver 20 is powered and a user can send an audio page to other field telephone assemblies 10 connected to the page circuit 100. When a user rotates the selector switch 38 to a first party line 102 while the field telephone 10 is off-hook, the speaker 34 is disabled and the user can communicate with another field telephone assembly 10 that is also off-hook with the first party line 102 selected. The LED 42 is also powered when the field telephone 10 is off-hook, indicating that a page line 100, or a party line 102, is connected and ready for audio transmission. The HEDs 46 and 48 are advantageous for use in the field telephone assemblies of a distributed audio system because they can facilitate on-hook/off-hook switching at the field telephone stations. This represents an advantage for intraplant voice communications systems which do not employ central office monitoring of off-hook conditions as in a conventional public switched telephone network.

Figure 4:
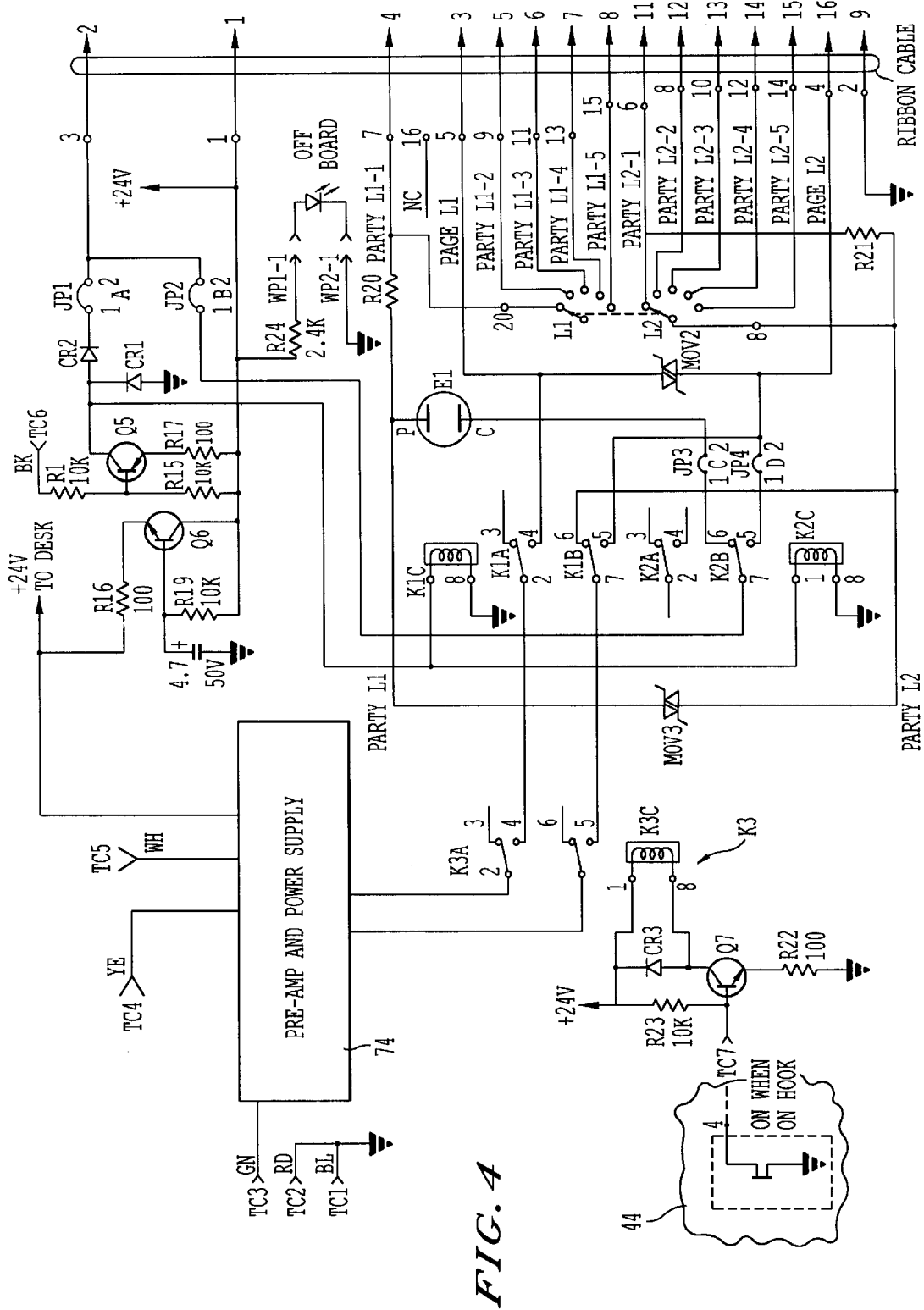
FIG. 4 is a schematic diagram of the field telephone assembly in FIG. 3.

FIG. 4 is a schematic diagram of components of the field telephone assembly 10. When the printed circuit hook switch board 44 sends an off-hook signal to TC7 on the pre-amp board 52, transistor Q7 is biased to a conductive state to energize a coil K3C of a relay K3. The relay contacts K3A and K3B are thereby switched to connect the page line 100 or a selected party line 102 to a power supply and pre-amplifier circuits 74. Page relay K1C responds to the page switch 50, connecting the handset 14 to a page line 100 while off-hook.

Figure 5:
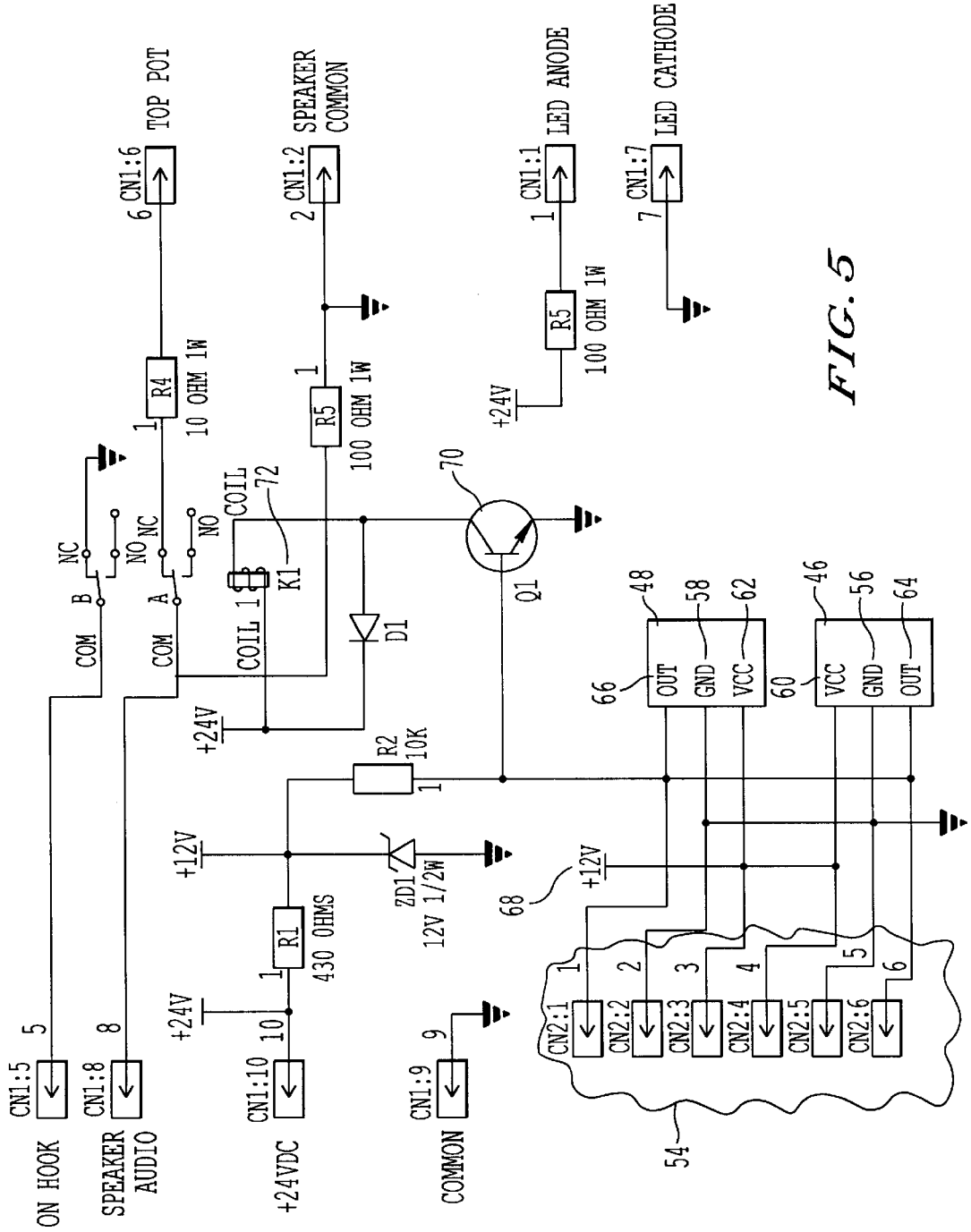
FIG. 5 depicts the schematic diagram of an HED printed circuit board for use in a communications station and constructed in accordance with an embodiment of the present invention.

FIG. 5 is a circuit diagram for a communications station having a Hall-effect device for on-hook/off-hook switching in accordance with an embodiment of the present invention. Two HEDs 46, 48 are connected to a first terminal strip 54. Each HED 46, 48 has a ground terminal 56, 58, a collector voltage supply terminal 60, 62 and an output terminal 64, 66. Each voltage supply terminal 60, 62 is connected to a 12-volt power supply line 68. Each output terminal 64, 66 is connected to a transistor Q1 70 for controlling the energization of the coil in a control relay 72. Ground terminals 56, 58 are connected to a common ground.

When a magnetic flux of proper polarity is placed near an BED 46, 48, a state change occurs, and an output voltage is generated by one of the HEDs 46, 48 and is applied to the coil of the control relay 72. Since the polarity of the magnet 22 or the polarity of a magnet contained in the speaker/receiver 20 may not be known, the two HEDs 46,48, are placed back-to-back and with opposing polarities on the printed circuit hook switch board 44. In this manner, one of the HEDs 46,48 changes state when the handset 14 is placed in the handset support cradle 28, thereby presenting a magnetic flux. One of the HEDs 46, 48 operates with the transistor 70 and the relay 72 to place the communications station on-hook. Thus, when the HED in ON, the communications station is on-hook, transistor 70 is off and the relay 72 is deenergized. Similarly, when the handset 14 is removed from the handset support cradle 28, thereby removing the magnetic flux from the vicinity of the HEDs 46, 48, the HED 46, 48 that was affected by the magnetic flux changes state, again placing the communications station off-hook.

If the communications station described in connection with FIG. 5 is implemented as a field telephone assembly as described in connection with FIGS. 3 and 4, on-hook for a field telephone 10 is when a communication signal cannot be transmitted to a pre-selected telephone line pair 102. Off-hook is when a communication signal can be transmitted because the field telephone 10 is actively connected to a telephone line pair 102. When powered, the normally open contacts of the control relay 72 are closed, and the communications station 10 is off-hook and connected to a telephone line. When the control relay 72 does not receive an output voltage, that is, when an HED 46, 48 is not biasing the transistor Q1 70 do to no magnetic flux from the handset 14, the normally closed contacts of the control relay 72 are closed, resulting in the communications station being on-hook and not connected to a party line 102.

In accordance with the embodiment of the present invention described in connection with FIGS. 3 and 4, the field telephone assembly 10 operates by having a caller first page another location, and then having the caller and any person hearing the page on another field telephone assembly 10, switch to one of several other channels provided to each field telephone assembly 10 for conversing. A page is initiated by lifting handset 14 from the nominal storage position in the handset support cradle 28. The lifting of the handset 14 removes the magnetic field from the HEDs 46, 48, resulting in the field telephone assembly 10 going off-hook on party line 102. The page switch 50 operates in a push-to-talk (PTT) mode similar to two-way radio communications. A user removes the handset 14 from the handset support cradle 28, presses the page switch 50, and talks into the handset microphone 18. The microphone 18 transmits the audio to all other field telephone assemblies 10 connected to the page line 100, where the audio is received at their respective speakers 34. The caller sending the page announces which party line 102 another user should access. Users wishing to reply to the caller at the receiving field telephone assemblies 10 must remove their respective handsets 14 from their handset support cradles 28, adjust switch 36 to the designated party line 102, and talk. The page function and the voice communications can be implemented using conventional transmission techniques.

The HEDs 46,48 can withstand harsher environments than mechanical switches, such as increased temperatures, increased temperature ranges, corrosive environments, and the like. Following integration of the HED ICs 46, 48 on the printed circuit hook switch board 44, the entire printed circuit hook switch board 44, with all components, can be sealed from environmental contaminants such as particulates, water, chemical vapors, and the like. The sealing means can be by encapsulation using, for example, solithane or other sealants to form a hermetic or nearly hermetic seal. Other forms of sealing or encapsulating a printed circuit board known in the art can be used, including, but not limited to, spraying on a protective coating, electrostatically applying a protective coating, laminating, and placing the board in a container having O-ring seals and interface connectors.

While a number of advantageous embodiments have been chosen to illustrate the present invention, it will be understood by those skilled in the art that various changes and modifications can be made therein without departing from the scope of the invention as defined in the appended claims.

What is claimed is:

1. A communications station for use in a voice communication system having at least one communications line comprising:
   a handset having a microphone, a speaker and a magnet for providing magnetic flux about said handset; and
   a base unit connected to said communications line and said handset and operable to receive signals from said microphone for transmission to said communications line and to transmit signals from said communications line to said speaker, said base unit having a handset cradle in which said handset can be placed, a Hall-effect device mounted on a circuit board in said base unit, and a hook switch device connected to said communications line, said circuit board being disposed within said base unit and with respect to said handset cradle to locate said Hall-effect device substantially opposite said magnet when said handset is placed in said handset cradle, said Hall-effect device being operable to generate an output signal when said handset is placed in said handset cradle and said Hall-effect device is proximal to said magnet and affected by said magnetic tlux from said magnet, said hook switch device being operable in response to said output signal to place said communications station on-hook with respect to said communications line;
   wherein said circuit board and said Hall-effect device are sealed using at least one of a plurality of methods comprising electrostatically applying a coating of a protective material, spraying a coating of a protective material, laminating and placing said circuit board and said Hall-effect device in a contained having seals and interface connectors.

2. A communications station as claimed in claim 1, wherein said hook switch device is operable to switch said communications station off-hook with respect to said communications line when said handset is at least partially removed from said handset cradle and said magnetic flux is decreased below a selected amount.

3. A communications station as claimed in claim 1, wherein said Hall-effect device comprises two unipolar Hall-effect circuits and arranged on said circuit board such that said two Hall-effect circuits have opposing polarities.

4. A communications station as claimed in claim 1, wherein said communications station is employed in an environment which is characterized by a condition which can be detrimental to the operation of said Hall-effect device and said hook switch device to switch said communications line to on-hook and off-hook, said base unit being configured such that at least said circuit board and said Hall-effect device are sealed to protect against said condition.

5. A communications station as claimed in claim 1, wherein said Hall-effect device operates in a temperature range of −40° C. to +170° C.

6. A communications station as claimed in claim 1, wherein said Hall-effect device operates in a temperature range of −40° C. to +70° C.

7. A communications station as claimed in claim 1, wherein said Hall-effect device operates in a temperature range of 0° C. to +50° C.

8. A communications station as claimed in claim 1, wherein said hook switch board is operable to place said communications line on-hook when said Hall-effect device is exposed to said magnetic flux greater than approximately 77 gauss.

9. A communications station as claimed in claim 1, wherein said hook switch board is operable to place said communications line off-hook when Hall-effect device is no longer exposed to said magnetic flux greater than approximately 21 gauss.

10. A communications station as claimed in claim 1, wherein said Hall-effect device is operable to change said output signal to one of a first state and a second state when said magnetic flux is above and below, respectively, a selected magnetic flux density range.

11. A communications station as claimed in claim 10, wherein said selected magnetic flux density range is approximately 50 gauss.

12. A communications station as claimed in claim 10, wherein a lower limit of said selected magnetic flux density range is approximately 15–30 gauss and an upper limit of said selected magnetic flux density range is greater than 40 gauss.

13. A communications station for use in a voice communication system having at least one party line for connecting the communications station to other communications stations sharing said party line comprising:
   a handset having a microphone, a speaker and a magnet for providing magnetic flux about said handset; and
   a base unit connected to said at least one party line and said handset and operable to receive signals from said microphone for transmission to said other communication stations and transmit signals from said at least one party line to said speaker, said base unit having a headset cradle in which said handset can be placed, a Hall-effect device mounted on said base unit, and a hook switch device connected to said at least one party line, said Hall-effect device being desposed with respect to said handset cradle to locate said Hall-effect device substantially opposite said magnet when said handset is placed in said handset cradle, said Hall-effect device being operable to generate an output signal when said handset is placed in said handset cradle and said Hall-effect device is placed proximally with respect to said magnet and affected by said magnetic flux from said magnet, said hook switch device being operable in response to said output signal to place said communications station on-hook with respect to said at least one party line;

wherein said communications system comprises a page line connected to said communications stations and to said other communications stations sharing said page line, a plurality of party lines and a line switch device to select one of said plurality of party lines, said page line being used to communicate which of said plurality of party lines to select, said hook switch device being operable in response to said output signal to place said communications station on-hook with respect to said selected party line.

14. A communications station as claimed in claim 13, wherein said hook switch device is operable to switch said communications station off-hook with respect to said selected party line when said handset is at least partially removed from said handset cradle and said magnetic flux is decreased below a selected amount.

\* \* \* \* \*